United States Patent [19]
Yoneyama

[11] Patent Number: 5,923,453
[45] Date of Patent: Jul. 13, 1999

[54] APPARATUS FOR MEASURING OPTICAL TRANSMISSION LINE PROPERTY AND OPTICAL WAVELENGTH MULTIPLEXING TRANSMISSION APPARATUS

[75] Inventor: Kenichi Yoneyama, Tokyo, Japan

[73] Assignee: NEC Corrporation, Tokyo, Japan

[21] Appl. No.: 08/734,301

[22] Filed: Oct. 21, 1996

[30] Foreign Application Priority Data

Oct. 19, 1995 [JP] Japan ................................. 7-270817

[51] Int. Cl.[6] .................................................. H04B 10/02
[52] U.S. Cl. ......................... 359/177; 359/110; 359/124; 359/166; 359/174
[58] Field of Search .................................. 359/110, 166, 359/124, 127, 143, 176, 177, 178, 179, 174

[56] References Cited

U.S. PATENT DOCUMENTS

| | | | |
|---|---|---|---|
| 5,485,299 | 1/1996 | Jones | 359/179 |
| 5,500,756 | 3/1996 | Tsushima et al. | 359/174 |
| 5,535,037 | 7/1996 | Yoneyama | 359/177 |
| 5,677,781 | 10/1997 | Mori et al. | 359/179 |
| 5,729,369 | 3/1998 | Zirngibl | 359/110 |
| 5,764,404 | 6/1998 | Yamane et al. | 359/160 |

*Primary Examiner*—Edward Lefkowitz
*Attorney, Agent, or Firm*—Scully, Scott Murphy and Presser

[57] ABSTRACT

Disclosed is an apparatus for measuring an optical transmission line property, which has: a pair of up and down optical fiber transmission apparatuses, each of which includes an optical transmission end office which includes a plurality of signal light sources for outputting signal lights with different wavelengths and an optical multiplexer for multiplexing the signal lights, an optical fiber transmission line and an optical reception end office which includes an optical divider for dividing the signal lights multiplexed and an optical receiver corresponding to each of the signal lights divided with different wavelengths; an optical turn circuit which includes an optical multiplexer and an optical divider and leads a part of light transmitting through the optical fiber transmission line to another optical fiber transmission line; and an optical power measuring circuit for measuring optical power distributions of a signal light propagating on the optical fiber transmission line and another signal light led to the optical fiber transmission line from another optical fiber transmission line.

29 Claims, 10 Drawing Sheets

1a: OPTICAL TRANSMISSION END OFFICE
1b: OPTICAL TRANSMISSION END OFFICE
2a: OPTICAL RECEPTION END OFFICE
2b: OPTICAL RECEPTION END OFFICE
3: OPTICAL FIBER TRANSMISSION LINE
4: OPTICAL AMPLIFIER REPEATER
5: SIGNAL LIGHT SOURCE
6: SIGNAL LIGHT
7: OPTICAL MULTIPLEXER
8: OPTICAL AMPLIFIER
9: OPTICAL DIVIDER
10: OPTICAL FILTER
11: OPTICAL RECEIVER
12: OPTICAL TURN CIRCUIT
13: OPTICAL DIVIDER
14: OPTICAL MULTIPLEXER
15: OPTICAL ATTENUATOR
16: OPTICAL DIVIDER
17: OPTICAL POWER SUPERVISORY CIRCUIT
18: WAVELENGTH TUNABLE EXTRACTION FILTER
24: OPTICAL TRANSMISSION POWER CONTROL CIRCUIT

1a : OPTICAL TRANSMISSION END OFFICE
1b : OPTICAL TRANSMISSION END OFFICE
2a : OPTICAL RECEPTION END OFFICE
2b : OPTICAL RECEPTION END OFFICE
3 : OPTICAL FIBER TRANSMISSION LINE
4 : OPTICAL AMPLIFIER REPEATER
5 : SIGNAL LIGHT SOURCE
6 : SIGNAL LIGHT
7 : OPTICAL MULTIPLEXER
8 : OPTICAL AMPLIFIER
9 : OPTICAL DIVIDER
10 : OPTICAL FILTER
11 : OPTICAL RECEIVER

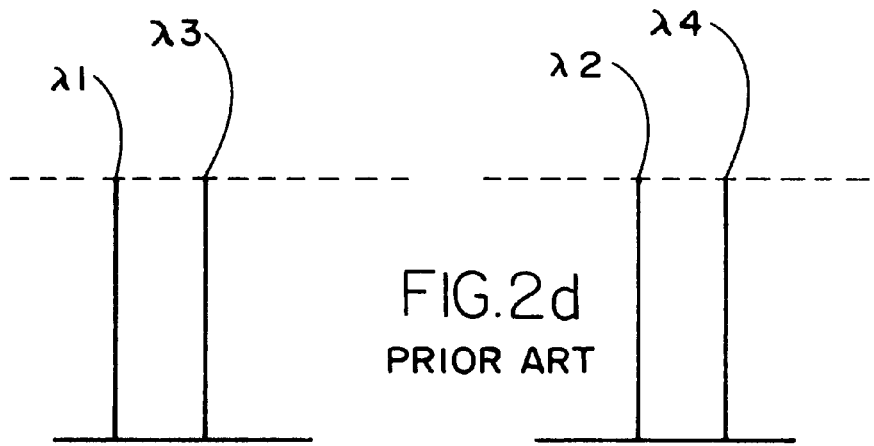
FIG.2a PRIOR ART
FIG.2d PRIOR ART
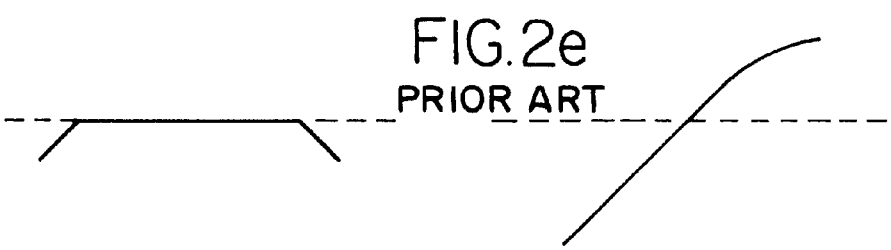
FIG.2b PRIOR ART
FIG.2e PRIOR ART
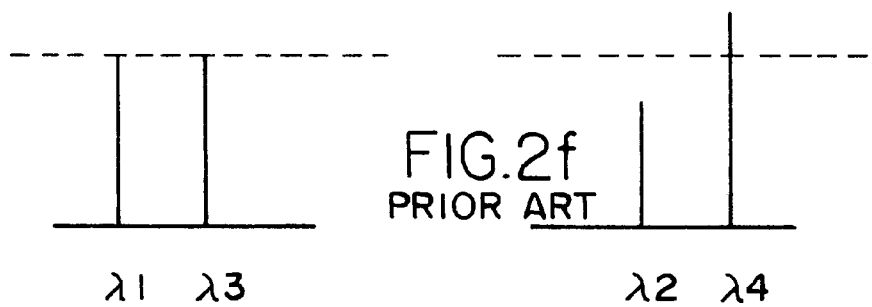
FIG.2c PRIOR ART
FIG.2f PRIOR ART

FIG. 3

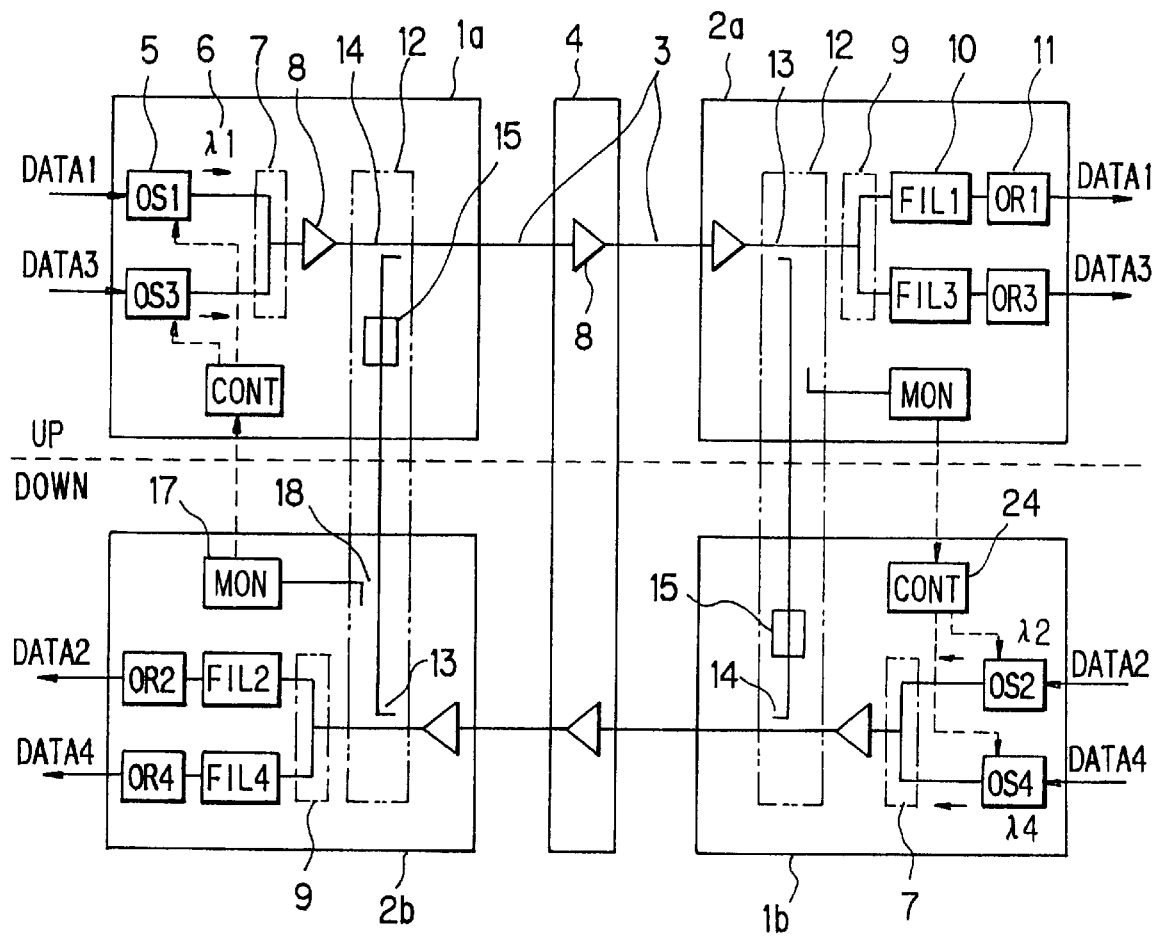

1a: OPTICAL TRANSMISSION END OFFICE
1b: OPTICAL TRANSMISSION END OFFICE
2a: OPTICAL RECEPTION END OFFICE
2b: OPTICAL RECEPTION END OFFICE
3: OPTICAL FIBER TRANSMISSION LINE
4: OPTICAL AMPLIFIER REPEATER
5: SIGNAL LIGHT SOURCE
6: SIGNAL LIGHT
7: OPTICAL MULTIPLEXER
8: OPTICAL AMPLIFIER
9: OPTICAL DIVIDER
10: OPTICAL FILTER
11: OPTICAL RECEIVER
12: OPTICAL TURN CIRCUIT
13: OPTICAL DIVIDER
14: OPTICAL MULTIPLEXER
15: OPTICAL ATTENUATOR
16: OPTICAL DIVIDER
17: OPTICAL POWER SUPERVISORY CIRCUIT
18: WAVELENGTH TUNABLE EXTRACTION FILTER
24: OPTICAL TRANSMISSION POWER CONTROL CIRCUIT

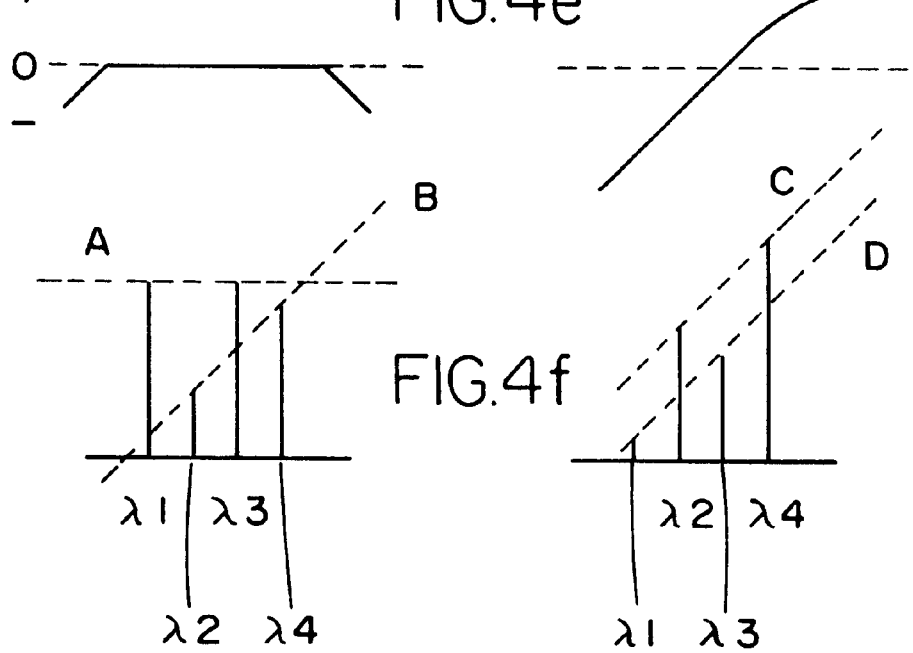
FIG.4a
FIG.4b
FIG.4c
FIG.4d
FIG.4e
FIG.4f

5: SIGNAL LIGHT SOURCE
25: LASER DIODE
26: PHOTODIODE
27: OPTICAL INTENSITY MODULATOR
28: LD POWER MONITORING CIRCUIT
29: LD CURRENT CONTROL CIRCUIT

3: OPTICAL FIBER TRANSMISSION LINE
4: OPTICAL AMPLIFIER REPEATER
8: OPTICAL AMPLIFIER
12: OPTICAL TURN CIRCUIT
13: OPTICAL DIVIDER
14: OPTICAL MULTIPLEXER

1: OPTICAL TRANSMISSION END OFFICE
3: OPTICAL FIBER TRANSMISSION LINE
5: SIGNAL LIGHT SOURCE
6: SIGNAL LIGHT
7: OPTICAL MULTIPLEXER
8: OPTICAL AMPLIFIER
12: OPTICAL TURN CIRCUIT
14: OPTICAL MULTIPLEXER
30: SUPERVISORY LIGHT SOURCE

5: SIGNAL LIGHT SOURCE
25: LASER DIODE
26: PHOTODIODE
27: OPTICAL INTENSITY MODULATOR
28: LD POWER MONITORING CIRCUIT
29: LD CURRENT CONTROL CIRCUIT
31: FREQUENCY OSCILLATOR

APPARATUS FOR MEASURING OPTICAL TRANSMISSION LINE PROPERTY AND OPTICAL WAVELENGTH MULTIPLEXING TRANSMISSION APPARATUS

FIELD OF THE INVENTION

This invention relates to an apparatus for measuring optical transmission line property, a method for measuring an optical transmission line property, an optical wavelength multiplexing transmission apparatus and an optical wavelength multiplexing transmission method.

BACKGROUND OF THE INVENTION

FIG. 1 shows a conventional optical wavelength multiplexing transmission system. This system is an example of two-wavelength-multiplexing optical signal transmission system, where each of up signal light wavelengths $\lambda 1$, $\lambda 3$ and down signal light wavelengths $\lambda 2$, $\lambda 4$ is multiplexed and transmitted.

In an up optical transmission end office 1a, signal lights 6 with wavelengths $\lambda 1$, $\lambda 3$ output from a signal light source 5 are multiplexed by an optical multiplexer 7 and then amplified by an optical amplifier 8, thereafter being transmitted through an optical fiber transmission line 3 and an optical amplifier repeater 4 to an up optical reception end office 2a. In the up optical reception end office 2a, the signal lights 6 are again amplified by an optical amplifier 8, being divided by an optical divider 9, being subject to the wavelength selection by optical filters 10 which correspond to the respective wavelengths $\lambda 1$, $\lambda 3$, and being received by optical receivers 11. The down optical transmission system where signal lights with wavelengths $\lambda 2$, $\lambda 4$ are transmitted has a like composition. In general, as the optical multiplexer 7 and optical divider 9, a wavelength multiplexing coupler, a fiber coupler or the like is used.

In the optical wavelength multiplexing transmission system, the signal lights with the wavelengths $\lambda 1$, $\lambda 3$ or $\lambda 2$, $\lambda 4$ which are output from the signal light sources 5 will have different gains and losses to the respective wavelengths due to the optical amplifier 8, optical fiber transmission line 3, optical coupler 7, 9 for coupling or dividing etc. This is because the gain or loss property in the above components composing the optical transmission line depends on wavelengths, particularly the optical amplifier 8 having a significant wavelength-dependency for gain. Here, erbium-doped optical fiber amplifiers, which are at present most generally used for the optical communication, also have the wavelength-dependency for gain. Therefore, research and development are being made such that they have a constant gain, i.e., a leveled gain, to different wavelengths of signal light to be suitable for the wavelength multiplexing transmission. Other than fiber amplifiers such as the erbium-doped optical amplifier, a semiconductor amplifier to which a semiconductor laser is applied can be used, but it also has the wavelength-dependency for gain.

Meanwhile, in the respective signal light sources 5 of the transmission end office, feedback control(output power control) is in general conducted to control the optical power(optical electric power) of the output signal light to be always constant while monitoring a part of the output signal light. For example, there is a method that a light-receiving photodiode(PD) detects the power of back emitting light of a laser diode(LD) as a signal light source to control the drive current of the laser diode.

At present, as described above, improvements of the wavelength property in such optical amplifiers and control techniques of the optical power of signal light sources are used in the development of optical wavelength multiplexing transmission system.

However, when an optical wavelength multiplexing transmission system is actually constructed and operated, the property change with time in the optical amplifier, optical fiber transmission line, optical couplers for multiplexing and dividing etc. may cause the change of gain or loss in signal lights with different wavelengths. Particularly in the optical amplifier, since the wavelength property for gain changes depending on the power(electric power) of the input signal light, the power of the is signal light input to the optical amplifier is reduced due to the increase in loss of the optical fiber transmission line with time, therefore damaging the levelness of gain of optical amplifier. Thus, in the signal light with a wavelength greatly affected by this, the power (electric power) of the signal light may be weakened when received by the optical reception end office, therefore not giving a sufficient S/N ratio.

This situation is explained with reference to (a) to (f) in FIG. 2. The situation of the up optical transmission line is shown by (a), (b) and (c) in FIG. 2, the situation of the down optical transmission line is shown by (d), (e) and (f) in FIG. 2. FIG. 2 shows the case that the up optical transmission line is normally operated and the wavelength property in the down optical transmission line is not normal. In FIG. 2, (a) and (d) show outputs of the signal lights 6 emitted from the signal light sources 5 of up and down optical transmission end offices 1a, 1b, respectively, (b) and (e) show the wavelength properties of up and down optical transmission systems, respectively, (c) and (f) show inputs of the signal lights 6 to the up and down optical reception end offices 2a, 2b, respectively.

If the wavelength property of the optical transmission line is, as shown in FIG. 2(e), not normal, the power of the signal light entering to the down optical reception end office 2b is affected by this, and particularly in the signal light(with the wavelength $\lambda 2$ shown in FIG. 2(f)) having much loss in the corresponding optical transmission line the power of receiving light is reduced, therefore deteriorating the S/N ratio.

SUMMARY OF THE INVENTION

Accordingly, it is an object of the invention to provide an method and apparatus which are provided with a means for determining and monitoring the situation of the wavelength properties of the entire optical transmission system.

According to the invention, a method for measuring an optical transmission line property, wherein a property of an optical transmission line where a wavelength-multiplexed signal light propagates is measured, comprises the steps of:

leading a part of the signal light propagating on the optical transmission line to another optical transmission line; and measuring optical power distributions of up and down signal lights with different wavelengths.

According to another aspect of the invention, an apparatus for measuring an optical transmission line property, comprises:

a pair of up and down optical fiber transmission apparatuses, each of which includes an optical transmission end office which includes a plurality of signal light sources for outputting signal lights with different wavelengths and an optical multiplexer for multiplexing the signal lights, an optical fiber transmission line and an optical reception end office which includes an optical divider for dividing the signal lights multiplexed and an optical receiver corresponding to each of the signal lights divided with different wavelengths;

an optical turn circuit which includes an optical multiplexer and an optical divider and leads a part of light transmitting through the optical fiber transmission line to another optical fiber transmission line; and an optical power measuring circuit for measuring optical power distributions of a signal light propagating on the optical fiber transmission line and another signal light led to the optical fiber transmission line from another optical fiber transmission line.

According to further aspect of the invention, an optical wavelength multiplexing transmission method, comprises the steps of:

leading a part of signal light which propagates on one of up and down optical transmission lines to another optical transmission line;

measuring optical power distributions of the up and down signal lights with different wavelengths; and controlling an optical transmission power of a signal light source on the basis of the distributions.

According to still further aspect of the invention, an optical wavelength multiplexing transmission apparatus, comprises:

a pair of up and down optical fiber transmission apparatuses, each of which includes an optical transmission end office which includes a plurality of signal light sources for outputting signal lights with different wavelengths and an optical multiplexer for multiplexing the signal lights, an optical fiber transmission line and an optical reception end office which includes an optical divider for dividing the signal lights multiplexed and an optical receiver corresponding to each of the signal lights divided with different wavelengths;

an optical turn circuit which includes an optical multiplexer and an optical divider and leads a part of light transmitting through the optical fiber transmission line to another optical fiber transmission line;

an optical power measuring circuit for measuring optical power distributions of a signal light propagating on the optical fiber transmission line and another signal light led to the optical fiber transmission line from another optical fiber transmission line; and an optical transmission power control circuit for controlling an optical transmission power of the signal light source on the basis of the distributions from the optical power measuring circuit.

BRIEF DESCRIPTION OF THE DRAWINGS

The invention will be explained in more detail in conjunction with the appended drawings, wherein:

FIG. 2 shows spectra of signal lights and wavelength properties of the optical fiber transmission line system in the apparatus shown in FIG. 1, FIG. 3 is a block diagram showing an optical wavelength multiplexing transmission apparatus in a preferred embodiment according to the invention, FIG. 4 shows spectra of signal lights and wavelength properties of the optical fiber transmission line system in the apparatus shown in FIG. 3.

DESCRIPTION OF THE PREFERRED EMBODIMENTS

Figure 1:
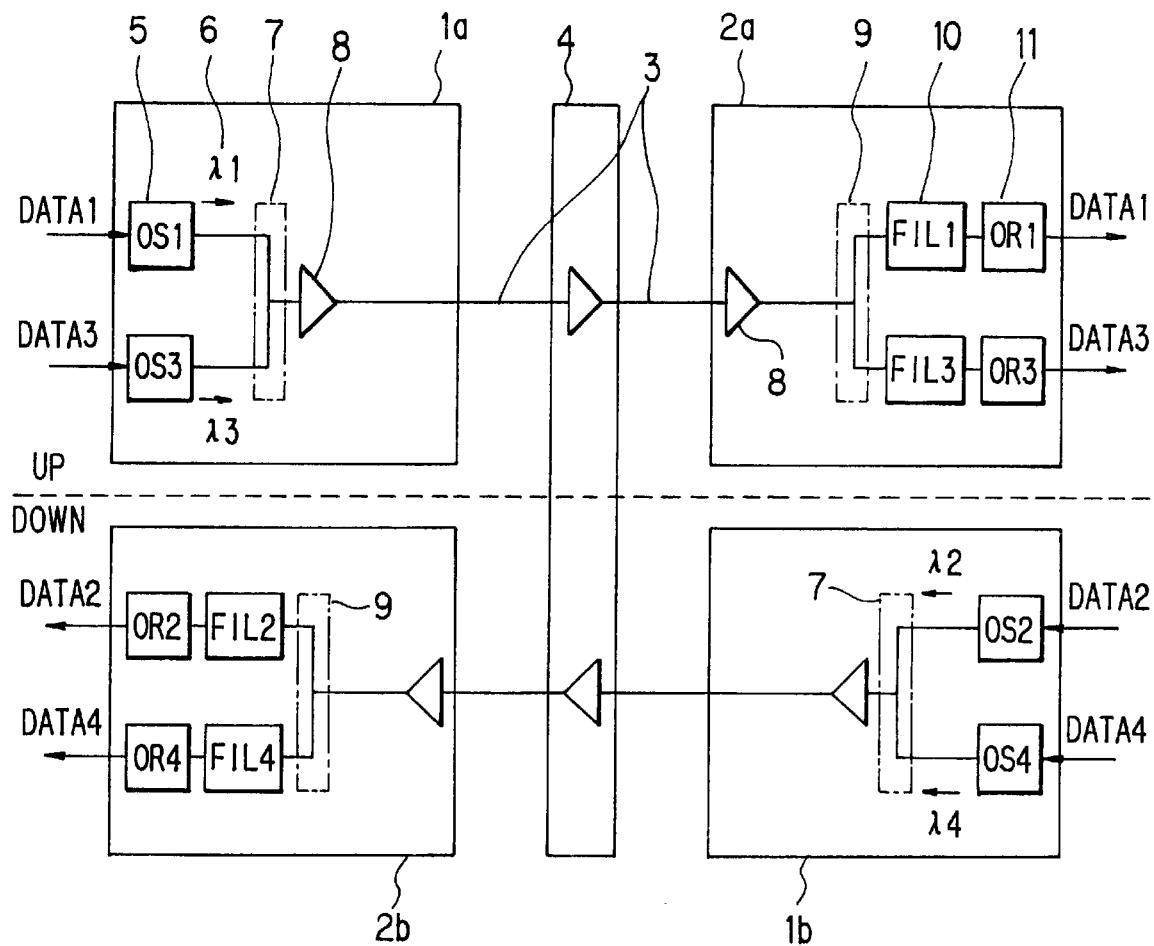
FIG. 1 is a block diagram showing a conventional optical wavelength multiplexing transmission apparatus.

An apparatus for measuring optical transmission line property and an optical wavelength multiplexing transmission apparatus in the preferred embodiment will be explained in FIG. 3, wherein like parts are indicated by like reference numerals as used in FIG. 1. Similarly to the example as shown in FIG. 1, this is an example of two-wavelength-multiplexing transmission, where each of up signal light wavelengths $\lambda 1$, $\lambda 3$ and down signal light wavelengths $\lambda 2$, $\lambda 4$ is multiplexed and transmitted.

In an up optical transmission end office 1a, signal lights 6 with wavelengths $\lambda 1$, $\lambda 3$ output from a signal light source 5 are multiplexed by an optical multiplexer 7 and then amplified by an optical amplifier 8, thereafter being transmitted through an optical fiber transmission line 3 and an optical amplifier repeater 4 to an up optical reception end office 2a. In the up optical reception end office 2a, the signal lights 6 are again amplified by an optical amplifier 8, being divided by an optical divider 9, being subject to the wavelength selection by optical filters 10 which correspond to the respective wavelengths $\lambda 1$, $\lambda 3$, and being received by optical receivers 11. The down optical transmission system where signal lights with wavelengths $\lambda 2$, $\lambda 4$ are transmitted has a like composition. In general, as the optical multiplexer 7 and optical divider 9, a wavelength multiplexing coupler, a fiber coupler or the like is used.

In the composition as shown in FIG. 3, there are provided optical turn circuits 12 for connecting between the optical transmission end office 1a and optical reception end office 2b and between the optical transmission end office 1b and optical reception end office 2a, respectively, whereby a part of the up signal light can be led turned to the down optical transmission line and a part of the down signal light can be led turned to the up optical transmission line. In the optical turn circuit 12, an optical divider 13 and an optical multiplexer 14 which are composed of an optical fiber coupler, optical wavelength multiplexing coupler or the like are used, where the dividing/coupling ratios of the optical divider 13 and optical multiplexer 14 are set such that the signal light to be turned has an optical power(electric power) that it does not affect the transmitting signal light 6. Optionally, the power(electric power) of the signal light to be turned may be optimized by inserting an optical attenuator 15 in the optical turn circuit 12.

As a means for monitoring the signal light 6, an optical divider 16 and an optical power supervisory circuit 17 are provided. The optical divider 16, which is inserted in the optical turn circuit 12 in FIG. 3, may be located at any place where the signal light to be transmitted through the optical transmission line can be divided, for example, between the optical divider 13 and the optical divider 9. Also, it may be inserted in the optical transmission end office. The optical power(electric power) supervisory circuit 17 has a function that it receives the light divided by the optical divider 16 and detects the optical power of the received signal light at each wavelength, and it further has an operational function that it arithmetically calculates the wavelength property of the entire optical transmission system from the optical power of the detected signal light at each wavelength.

If the wavelength property of the optical transmission system obtained by the optical power(electric power) supervisory circuit 17 is beyond a permitted range, the optical transmission condition may be modified to control it. For example, the power of the light source may be controlled based on the wavelength property of the optical transmission line. In FIG. 3, an optical transmission power(electric power) control circuit 24 is provided which controls the optical output power(optical transmission electric power) of the signal light source at each wavelength, based on the wavelength property of the optical transmission system which is output as an operational result from the optical power supervisory circuit 17.

With reference to (a) to (f) in FIG. 4, operations of the optical power supervisory circuit 17 will be explained. The situation of the up optical transmission line is shown by (a), (b) and (c) in FIG. 4, the situation of the down optical transmission line is shown by (d), (e) and (f) in FIG. 4. FIG. 4 shows the case that the up optical transmission line is normally operated and the wavelength property in the down optical transmission line is not normal. In FIG. 4, (a) and (d) show outputs of the signal lights 6 emitted from the signal light sources 5 of up and down optical transmission end offices 1a, 1b, respectively, (b) and (e) show the wavelength properties of up and down optical transmission systems, respectively, and (c) and (f) show inputs of the signal lights 6 to the up and down optical reception end offices 2a, 2b, respectively.

The spectra of the signal lights($\lambda 1, \lambda 2, \lambda 3, \lambda 4$) which are output from the optical amplifiers 8 of the optical transmission end offices 1a, 1b are, as shown by (a), (d) in FIG. 4, controlled to be constant both at up and down wavelengths.

The signal light with wavelengths $\lambda 1, \lambda 3$ output from the up optical transmission end office 1a transmits through the up optical transmission line to be received by the up optical reception end office 2a. On the other hand, the signal light with wavelengths $\lambda 2, \lambda 4$ output from the down optical transmission end office 1b transmits through the down optical transmission line, being led to the up optical transmission line through the optical turn circuit 12, transmitting through the up optical transmission line to be received by the up optical reception end office 2a. In this case, the spectrum of the signal light turned and input into the optical power supervisory circuit 17 is as shown by (c) in FIG. 4. The signal light with wavelengths $\lambda 2, \lambda 4$ in the spectrum has an optical-power-to-wavelength inclination indicated by a dotted line B. The optical power of the up signal light($\lambda 1$ and $\lambda 3$) shows an inclination indicated by a dotted line A. The difference between the inclinations of the dotted lines A and B is equal to the property as shown by (e) in FIG. 4, i.e., the wavelength property of the entire down optical fiber transmission system.

Similarly, the signal light with wavelengths $\lambda 2, \lambda 4$ output from the down optical transmission end office 1b transmits through the down optical transmission line to be received by the down optical reception end office 2b. On the other hand, the signal light with wavelengths $\lambda 1, \lambda 3$ output from the up optical transmission end office 1b transmits through the up optical transmission line, being led to the down optical transmission line through the optical turn circuit 12, transmitting through the down optical transmission line to be received by the down optical reception end office 2b. In this case, the spectrum of the signal light turned and input into the optical power supervisory circuit 17 is as shown by (f) in FIG. 4. The signal light with wavelengths A1, A3 in the spectrum has an optical-power-to-wavelength inclination indicated by a dotted line D. The optical power of the down signal light($\lambda 2$ and $\lambda 4$) shows an inclination indicated by a dotted line C. Calculating the difference between the inclinations of dotted lines C and D, the property as shown by (b) in FIG. 4, i.e., the wavelength property of the entire up optical fiber transmission system, can be determined.

Here, the wavelengths $\lambda 1, \lambda 2, \lambda 3$ and $\lambda 4$ of the signal lights are 1554 nm, 1556 nm, 1558 nm and 1560 nm, respectively.

Based on these wavelength properties, the control circuit 24 can control the power of the light source in the optical transmission end office to respond to the changes in gain or loss with time in the optical transmission system.

Figure 5:
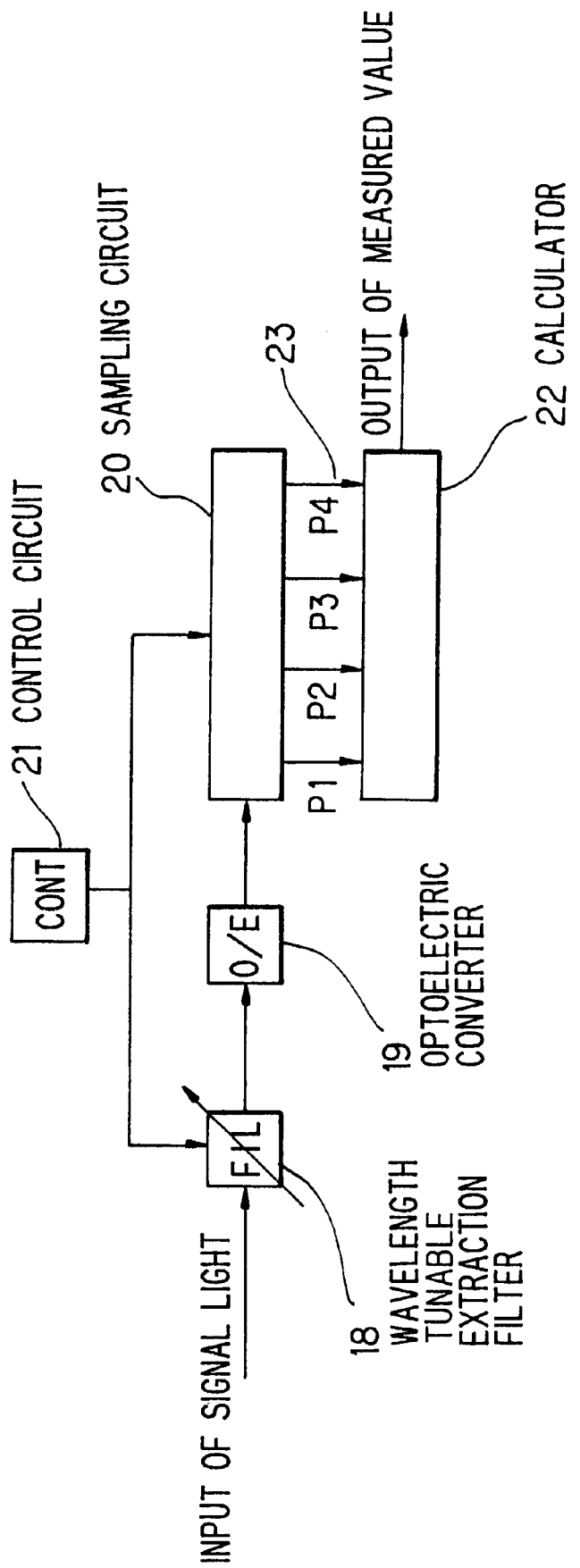
FIG. 5 is a block diagram showing an example of an optical power supervisory circuit in FIG. 3.

An example of the optical power supervisory circuit 17 will be explained in FIG. 5. A control circuit 21 sets a wavelength of signal light to be extracted by a wavelength tunable extraction filter 18, and the power of the signal light which is converted into electricity by an optoelectric converter 19 is sampled by a sampling circuit 20, and the power value 23 of the signal light at each wavelength is led into a calculator 22. When the control circuit 21 sequentially selects the wavelength of the signal light to be measured and the power values 23 of the signal lights at different wavelengths are input to the calculator 22, the calculator 22 calculates the wavelength property regarding the gain/loss of the entire optical transmission system and outputs the result of the calculation.

Figure 6:
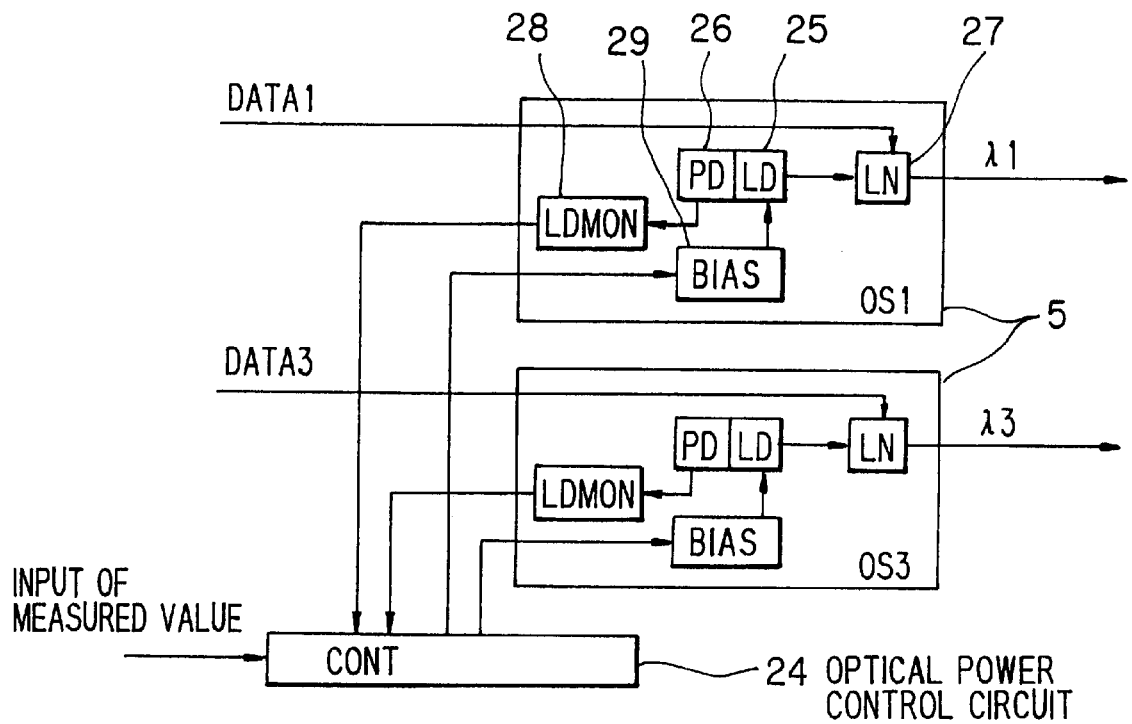
FIG. 6 is a block diagram showing an example of an optical power transmission control circuit in FIG. 3.

An example of the optical transmission power(electric power) control circuit 24 will be explained in FIG. 6. The signal light source 5 modulates the light of a laser diode 25 by an optical intensity modulator 27 to superpose the data. Here, the optical intensity modulator 27 may include a lithium niobate modulator, EA(electro-absorption) modulator and the like. The optical transmission power(electric power) control circuit 24, when it inputs the measurement result output from the optical power supervisory circuit 17, orders LD current control circuits 29 to change the bias current of each laser diode 25 in order to change the power of the signal light corresponding to a wavelength where the loss value in the optical fiber transmission line system is varied, based on the resultant information. For example, LD current is increased in the case that the loss value of the optical transmission line to a wavelength is increased. Thus, the optical transmission power(electric power) 24 always monitors the transmission optical power(electric power) at each wavelength and controls it such that the correction power value obtained from the measurement result is added or subtracted to or from the current power value.

Here, used is a method for monitoring the transmission optical power, where the back output power of the laser diode 25 is detected by a photodiode 26, then converting into electric information at a LD power monitoring circuit 28. In another way, it may be monitored such that the output light is divided by an optical coupler and then is photoelectrically detected.

Figure 7:
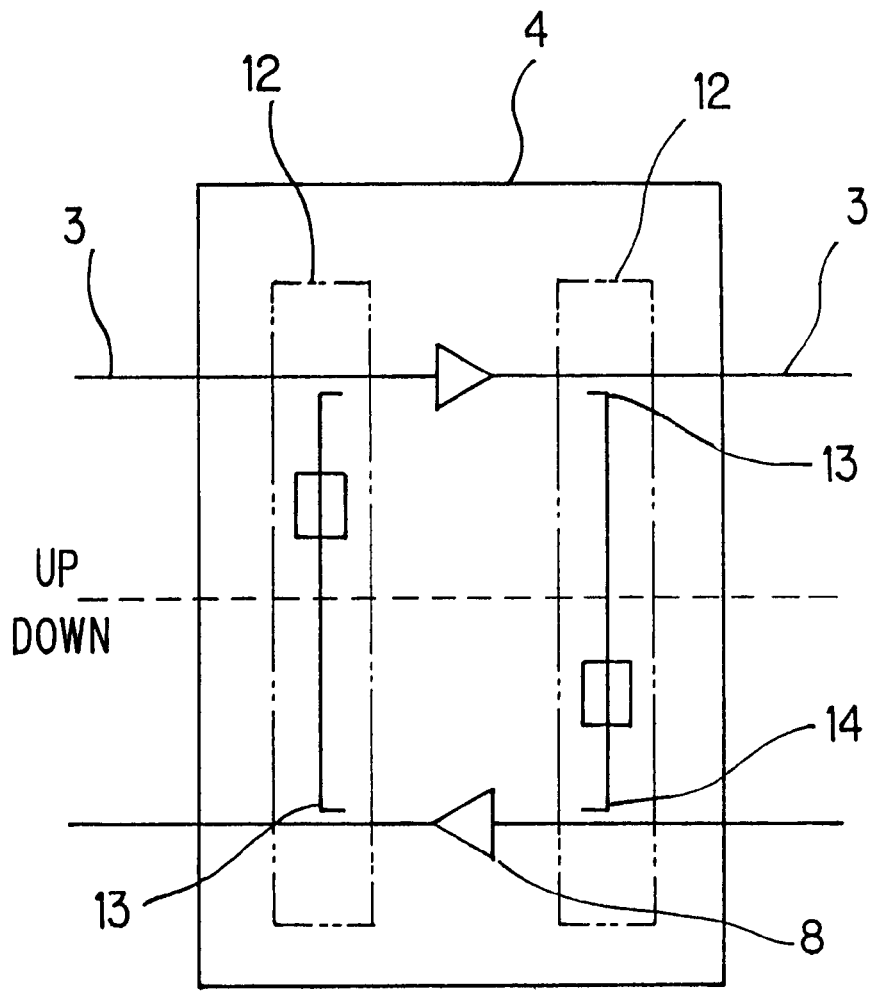
FIG. 7 is a block diagram showing an example of an optical amplifier repeater in FIG. 3.

FIG. 7 shows an example of the optical amplifier repeater 4 which is provided with optical turn circuits 12. In the embodiment as shown in FIG. 3, there are provided the optical turn circuits 12 in the optical transmission end office and optical reception end office. However, as shown in FIG. 7, when the optical turn circuit 12 is provided with the optical amplifier repeater 4 which is inserted in the optical fiber transmission line, the transmission line property at each repeater section can be monitored. Herein, if a plurality of such optical amplifier repeaters 4 are inserted, optical signals from the respective repeaters will be simultaneously turned. Therefore, to separately analyze them, the sampling time of each signal is needed to be adjusted by a certain signal sampling method.

Figure 8:
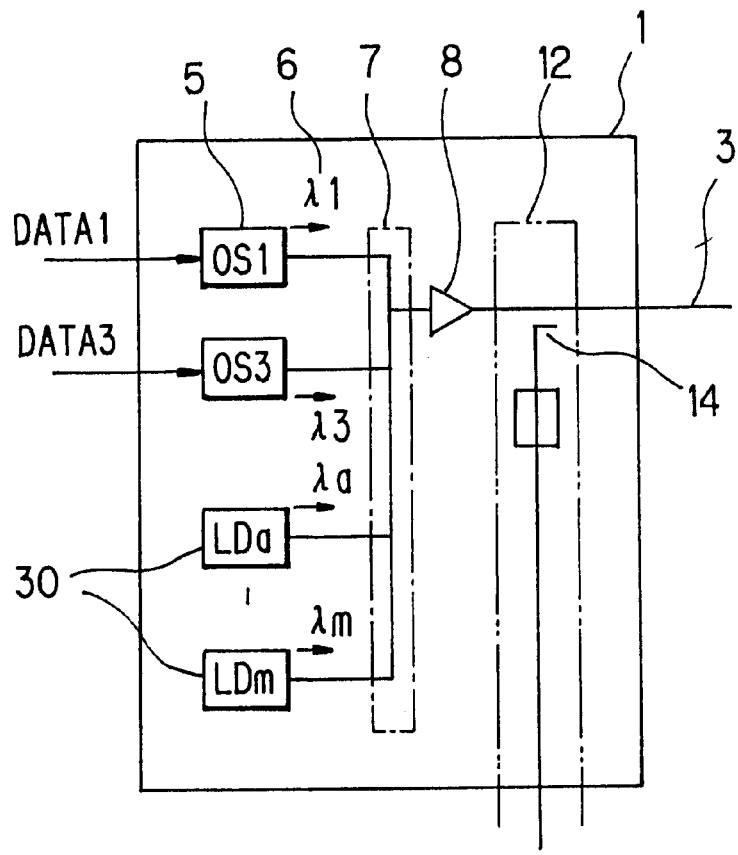
FIG. 8 is a block diagram showing another example of an optical transmission end office in FIG. 3.

FIG. 8 shows an example of the optical transmission end office which is provided with supervisory light sources 30. In addition to the example as shown in FIG. 3, the supervisory light for monitoring the optical fiber transmission line property other than the signal light can be inserted. As shown in FIG. 8, a plurality of supervisory light sources 30, where even one light source can be effective, different from the signal light source 5 are provided, their lights being output multiplexed with the signal lights. Though the optical power supervisory circuit 17 may be the same as that in FIG. 5, it needs to be set to also detect the optical power at the wavelengths of the supervisory lights. In this case, the wavelength property of the entire optical transmission system can be calculated only by the supervisory light or by the signal light and supervisory light. The merit of this manner is in that the optical fiber transmission line property can be in detail measured by optionally increasing the number of wavelengths of the supervisory light. The wavelengths of the supervisory light, corresponding to the wavelengths of the signal light described above, may be located between the signal light wavelengths or apart from the signal light wavelengths by a few nanometers, for example, 1553 nm, 1555 nm, 1557 nm, 1559 nm and 1561 nm.

Figure 9:
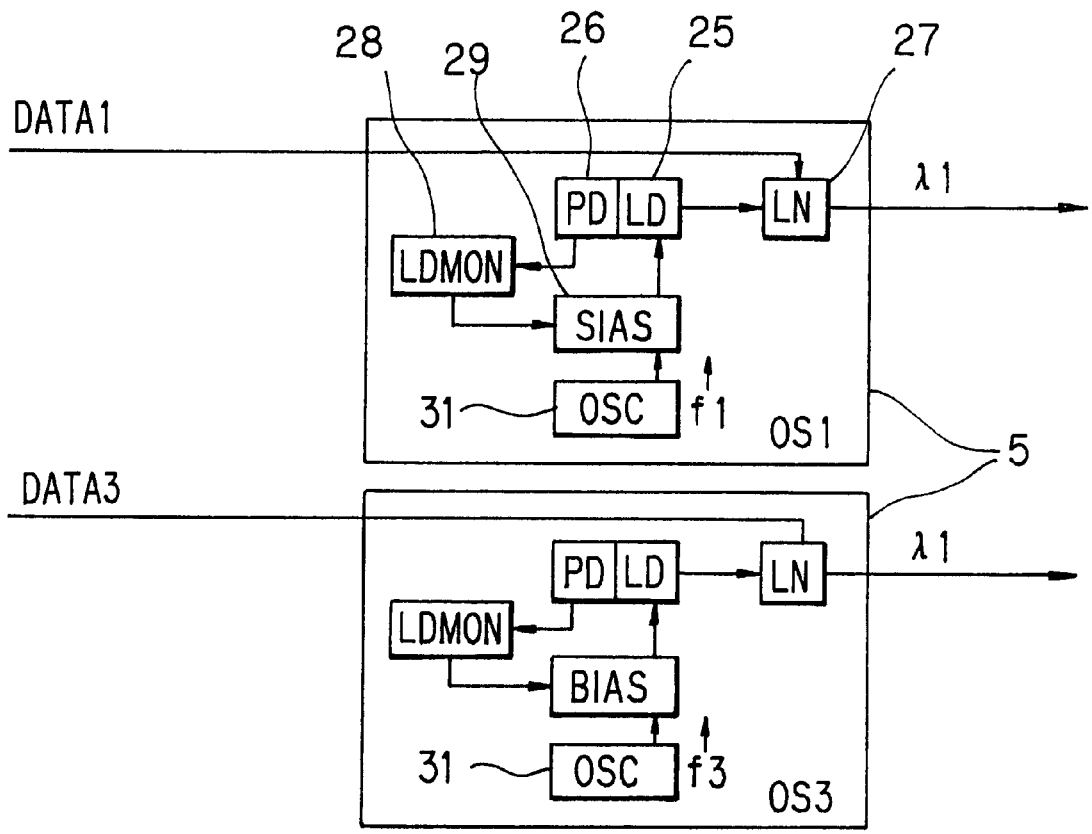
FIG. 9 is a block diagram showing further another example of an optical transmission end office in FIG. 3.

A method for superposing an auxiliary signal with a frequency proper to the signal light source will be explained in FIG. 9. In the above-mentioned embodiments, the power (electric power) of the signal light at each wavelength or the supervisory light is directly measured. However, in this embodiment, the auxiliary signal with a proper frequency (or a proper signal manner) is superposed on the signal light at each wavelength and then is transmitted, and the optical power supervisory circuit 17 detects the intensity of the auxiliary signal to measure the wavelength property regarding the gain/loss of the optical transmission system. In this case, in an example of the optical transmission end office, the bias current to the laser diode 25 is intensity-modulated by a frequency oscillator 31 with a proper supervisory frequency to modulate the intensity of the signal light to output the auxiliary signal. Alternatively, the auxiliary signal can be superposed by way of the frequency modulation or phase modulation.

Figure 10:
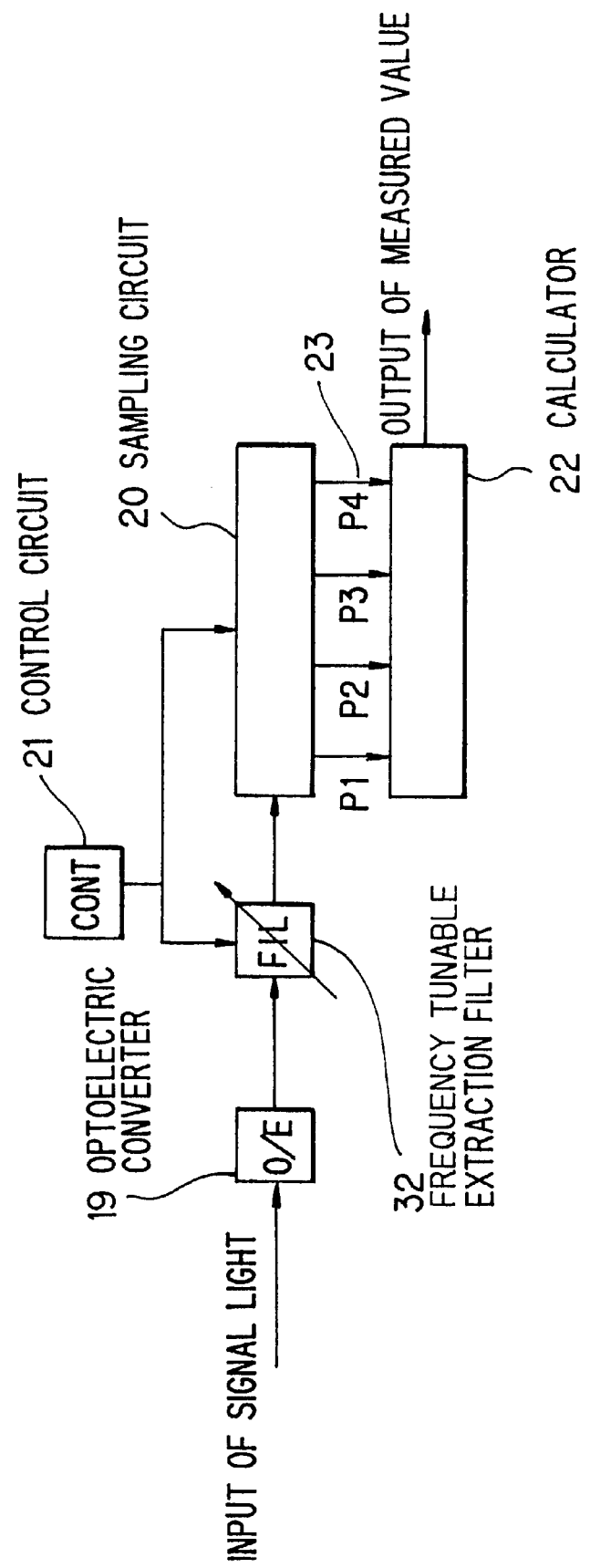
FIG. 10 is a block diagram showing another example of an optical power supervisory circuit in FIG. 3.

In the case of using the above method, the optical power supervisory circuit 17, as shown in FIG. 10, first converts the signal light into an electric signal through the optoelectric converter 19, then selecting signals through a frequency tunable extraction filter 32 for electric signal by order of a control circuit 21, thereafter monitoring the intensity of the auxiliary signal with the proper supervisory frequency. In this case, the frequencies of the auxiliary signals to be superposed are, for example, 10 MHz, 10.1 MHz and 10.2 MHz.

Meanwhile, this measuring method that proper auxiliary signals are superposed can be also applied to the above-mentioned method of using the supervisory light source.

Although the invention has been described with respect to specific embodiment for complete and clear disclosure, the appended claims are not to be thus limited but are to be is construed as embodying all modification and alternative constructions that may be occurred to one skilled in the art which fairly fall within the basic teaching here is set forth.

What is claimed is:

1. A method for measuring an optical transmission line property, comprising the steps of:

wavelength-multiplexing a plurality of different wavelength optical signals to form a wavelength-multiplexed signal light which is propagated along the optical transmission line;

leading a part of said signal light propagating on said optical transmission line to another optical transmission line, wherein said part of said signal light includes the plurality of different wavelength-multiplexed optical signals;

measuring optical power distributions, including optical power of each of the plurality of different wavelength optical signals, of up and down signal lights led to the another optical transmission line to determine the wavelength dependent characteristics of the optical transmission line.

2. A method for measuring an optical transmission line property, according to claim 1, wherein:

one or a plurality of supervisory optical signal lights other than said wavelength-multiplexed signal light propagates on said optical transmission line, said supervisory light having a wavelength different from that of said wavelength-multiplexed signal light, and an optical power distribution, including optical power of each of the plurality of different wavelength optical signals, of said supervisory light or both said supervisory light and said wavelength-multiplexed signal light is measured.

3. A method for measuring an optical transmission line property, according to claim 2, wherein:

a proper auxiliary signal is superposed on said wavelength-multiplexed signal light and/or said supervisory light, and a power distribution of said auxiliary signal is measured.

4. An apparatus for measuring an optical transmission line property comprising:

a pair of up and down optical fiber transmission systems, each of which includes an optical transmission end office which includes a plurality of signal light sources for outputting signal lights with different wavelengths and an optical multiplexer for wavelength-multiplexing said signal lights to form a wavelength-multiplexed signal light, an optical fiber transmission line, and an optical reception end office which includes an optical divider for dividing said signal lights multiplexed and an optical receiver corresponding to each of said signal lights divided with different wavelengths;

an optical turn circuit, including an optical multiplexer and an optical divider, which leads a part of light transmitting through said optical fiber transmission line to another optical fiber transmission line, wherein said part of said signal light includes the plurality of different wavelength-multiplexed optical signals; and an optical power measuring circuit for measuring optical power distributions, including optical power of each of the plurality of different wavelength optical signals, of a signal light propagating on said optical fiber transmission line and another signal light led to said optical fiber transmission line from another optical fiber transmission line.

5. An apparatus for measuring an optical transmission line property, according to claim 4, wherein:

each said optical fiber transmission line is provided with one or a plurality of optical amplifier repeaters.

6. An apparatus for measuring an optical transmission line property, according to claim 4, wherein:

a said optical turn circuit is disposed in said optical transmission end office and a said optical turn circuit is also disposed in said optical reception end office.

7. An apparatus for measuring an optical transmission line property, according to claim 5, wherein:

a said optical turn circuit is disposed in said optical transmission end office and a said optical turn circuit is also disposed in said optical reception end office.

8. An apparatus for measuring an optical transmission line property, according to claim 5, wherein:

said optical turn circuit is disposed in a said optical amplifier repeater.

9. An apparatus for measuring an optical transmission line property, according to claim 4, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

10. An apparatus for measuring an optical transmission line property, according to claim 5, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

11. An apparatus for measuring an optical transmission line property, according to claim 6, wherein:

said optical transmission end office is provided with one or a plurality of supervisory light sources for outputting a supervisory light with a wavelength different from that of said wavelength-multiplexed signal light and an optical multiplexer for wavelenqth-multiplexing said wavelength-multiplexed signal lights and said supervisory light.

12. An apparatus for measuring an optical transmission line property, according to claim 7, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

13. An apparatus for measuring an optical transmission line property, according to claim 8, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

14. An apparatus for measuring an optical transmission line property, according to claim 4, wherein:

said plurality of signal light sources is provided with a means for superposing a proper auxiliary signal on said wavelength-multiplexed signal light.

15. An apparatus for measuring an optical transmission line property, according to claim 14, wherein:

said plurality of signal light sources and/or said supervisory light is provided with a means for superposing a proper auxiliary signal on said wavelength-multiplexed signal light.

16. An optical wavelength multiplexing transmission method, comprising the steps of:

wavelength-multiplexing a plurality of different wavelength signals to form a wavelength-multiplexed up signal light which is propagated along an up optical transmission line, and wavelength-multiplexing a plurality of different wavelength optical signals to form a wavelength-multiplexed down signal light which is propagated along a down optical transmission line;

leading a part of the wavelength-multiplexed signal light which propagates on one of said up and down optical transmission lines to another optical transmission line, wherein said part of said signal light includes the plurality of different wavelength-multiplexed optical signals;

measuring optical power distributions, including optical power of each of the plurality of different wavelength optical signals, of up and down signal lights led to the another optical transmission line to determine the wavelength dependent characteristics of the optical transmission line; and controlling an optical transmission power of a signal light source on the basis of said distributions.

17. An optical wavelength-multiplexing transmission method, according to claim 16, wherein:

one or a plurality of supervisory optical signal lights other than said wavelength-multiplexed signal light propagates on said optical transmission line, said supervisory light having a wavelength different from that of said wavelength-multiplexed signal light, and an optical power distribution, including optical sower of each of the plurality of different wavelength optical signals, of said supervisory light or both said supervisory light and said wavelength-multiplexed signal light is measured, and an optical transmission power of a signal light source is controlled on the basis of said distribution.

18. An optical wavelength multiplexing transmission method, according to claim 17, wherein:

a proper auxiliary signal is superposed on said wavelength-multiplexed signal light and/or said supervisory light, and a power distribution of said auxiliary signal is measured, and an optical transmission power of a signal light source is controlled on the basis of said distribution.

19. An optical wavelength multiplexing transmission apparatus, comprising:

a pair of up and down optical fiber transmission systems, each of which includes an optical transmission end office which includes a plurality of signal light sources for outputting signal lights with different wavelengths and an optical multiplexer for wavelength-multiplexing said signal lights to form a wavelength-multiplexed signal light, an optical fiber transmission line, and an optical reception end office which includes an optical divider for dividing said signal lights multiplexed and an optical receiver corresponding to each of said signal lights divided with different wavelengths;

an optical turn circuit, including an optical multiplexer and an optical divider, which leads a part of light transmitting through one of said optical fiber transmission lines to another optical fiber transmission line, wherein said part of said signal light includes the plurality of different wavelength-multiplexed optical signals; and an optical power measuring circuit for measuring optical power distributions, including optical sower of each of the plurality of different wavelength optical signals, of a signal light propagating on one of said optical fiber transmission lines and another signal light led to said optical fiber transmission line from another optical fiber transmission line; and an optical transmission power control circuit for controlling an optical transmission power of a signal light source on the basis of said measured distributions from said optical power measuring circuit.

20. An optical wavelength multiplexing transmission apparatus, according to claim 19, wherein:

said optical fiber transmission line in each of said up and down optical fiber transmission systems is provided with one or a plurality of optical amplifier repeaters.

21. An optical wavelength multiplexing transmission apparatus, according to claim 19, wherein:

a said optical turn circuit is disposed in said optical transmission end office and a said optical turn circuit is also disposed in said optical reception end office.

22. An optical wavelength multiplexing transmission apparatus, according to claim 20, wherein:

a said optical turn circuit is disposed in said optical transmission end office and a said optical turn circuit is also disposed in said optical reception end office.

23. An optical wavelength multiplexing transmission apparatus, according to claim 20, wherein:

said optical turn circuit is disposed in a said optical amplifier repeater.

24. An optical wavelength multiplexing transmission apparatus, according to claim 19, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

25. An optical wavelength multiplexing transmission apparatus, according to claim 20, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

26. An optical wavelength multiplexing transmission apparatus, according to claim 21, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

27. An optical wavelength multiplexing transmission apparatus, according to claim 22, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

28. An optical wavelength multiplexing transmission apparatus, according to claim 23, wherein:

said optical transmission end office is provided with one or a plurality of supervisory light sources for outputting a supervisory light with a wavelength different from that of said wavelength-multiplexed signal light and an optical multiplexer for wavelength-multiplexing said wavelength-multiplexed signal lights and said supervisory light.

29. An optical wavelength multiplexing transmission apparatus, according to claim 19, wherein:

said light source of said signal light is provided with a means for superposing a proper auxiliary signal.

* * * * *